United States Patent [19]

Nishiwaki

[11] Patent Number: 5,431,844
[45] Date of Patent: Jul. 11, 1995

[54] METHOD OF MANUFACTURING A CONDUCTIVE RESIN COMPOSITION

[76] Inventor: Atushi Nishiwaki, 1-11, 2-chome, Funakoshi-cho, Chuo-ku, Osaka-shi, Osaka, Japan

[21] Appl. No.: 91,278

[22] Filed: Jul. 15, 1993

[30] Foreign Application Priority Data

Jun. 11, 1993 [JP] Japan .................................. 5-140812

[51] Int. Cl.$^6$ .......................... H01B 1/00; H01B 1/20; H01B 1/24
[52] U.S. Cl. ................................... 252/511; 252/502; 252/510; 106/472; 264/105
[58] Field of Search ............... 252/500, 502, 510, 511; 106/472; 264/105

[56] References Cited

U.S. PATENT DOCUMENTS 4,705,646 11/1987 DuPont et al. ..................... 252/511
5,078,936 1/1992 Parish et al. ........................ 252/511

*Primary Examiner*—Paul Lieberman
*Assistant Examiner*—M. Kopec
*Attorney, Agent, or Firm*—Wenderoth, Lind & Ponack

[57] ABSTRACT

The present invention provides a method of manufacturing a conductive resin composition. The method is comprised of kneading carbonaceous conductive material, together with a solvent, in a medium stirring mill, and mixing the resultant slurry-form kneaded mixture containing the carbonaceous conductive material pulverized to an average particle size of up to 20 μm into a resin matrix.

It is possible for the invention to achieve highly uniform dispersion of the carbonaceous conductive material into the resin, easily mix same into theresin matrix, and achieve an excellent conductivity.

2 Claims, No Drawings

METHOD OF MANUFACTURING A CONDUCTIVE RESIN COMPOSITION

FIELD OF THE INVENTION

The present invention relates to a method of manufacturing a conductive resin composition. More particularly, the present invention relates to a method of manufacturing a novel conductive resin composition which is useful in a wide range of areas including paint, ink, rubber, and plastics is excellent in dispersibility of a carbonaceous conductive material, permits achievement of high conductivity, and is easy to handle.

PRIOR ART

Resin composition imparted conductivity have conventionally been used for applications such as paint, ink, rubber and various plastics. As such conductive resin composition, there are known materials prepared by blending a conductive filler such as metal powder or fibre, carbon black or carbon fibre with resins.

Among others, carbonaceous conductive materials such as carbon black and carbon fibre are most commonly utilized as components of conductive resin composition.

However, such a carbonaceous conductive material to be added for imparting conductivity is difficult to disperse into a resin as compared with ordinary carbon black. It has therefore been impossible to inhibit agglomeration by secondary agglutination of such conductive materials and it has been difficult to meet the requirements for uniform dispersion, a high conductivity and a satsifactory formability.

Uniform dispersion into a resin at a high degree is actually very difficult even in such conductive carbon as Ketchen black and acetylene black, known to provide a high conductivity by a slight addition, and in carbon fibrils comprising microfibrils attracting the general attention as new carbonaceous materiala (those disclosed, for example, in U.S. Pat. No. 4,663,230 and Japanese Patent Provisional Publication No. 60-500,943).

For the purpose of dispersing these carbonaceous conductive materials, it has been the conventional practice to impart softness to a resin by, for example, heating and mixing or by the use of a plasticizer in a large quantity, and then directly add a conductive material.

These practices have however a drawback of possibly causing degradation and deterioration of the resin itself and involve problems in that properties as a resin composition and even areas of application thereof may be limited.

In order to uniformly disperse a conductive material and obtain a high conductivity with addition in a slight amount, it is necessary to achieve a higher contact probability of particles of the conductive material and a lower contact resistance between particles, A carbonaceous material as a conductive material is however poor in wettability with a solvent and a resin matrix. In addition, while larger particles having a larger specific surface area are preferable for imparting conductivity, particles having a larger specific surface area tend to easily agglutinate, form aggregates presenting an exterior view of chains of fringes (spawns), and this is a problem in that it is not easy to break these aggregates, It has thus been still very difficult to achieve uniform dispersion of a carbonaceous conductive material and a satisfactory conductivity.

SUMMARY OF THE INVENTION

The present invention was developed in view of the circumstances as described above, and has an object to provide a method of manufacturing a novel resin composition, which solves the drawbacks in the conventional blending technique of a carbonaceous conductive material, and permits achievement of a high conductivity and uniform dispersion of the conductive material.

The present invention provides a method of manufacturing a conductive resin composition, which comprises the steps of kneading a carbonaceous conductive material with a solvent in a medium stirring mill, and mixing the resultant slurry kneaded mixture containing the carbonaceous conductive material pulverized to an average particle size of up to 20 $\mu$m into a resin matrix.

In the present invention, a preferred embodiment is to pulverize the carbonaceous material as the conductive material to an average particle size within a range of from 1 to 2 $\mu$m.

DETAILED DESCRIPTION OF THE INVENTION

In the conventional technique, it is actually difficult to achieve uniform dispersion of a carbonaceous conductive material, and quality degradation of a resin or a composition thereof and restriction on the scope of application are unavoidable. In the present invention, in contrast, in which the carbonaceous conductive material pulverized in a medium stirring mill to an average particle size of up to 20 $\mu$m and mixed in a slurry state into a resin matrix, dispersion of the carbonaceous conductive material becomes uniform and a satisfactory conductivity can be achieved with addition in a slight amount.

Because, according to the method of the present invention, the carbonaceous conductive material is finely pulverized to an average particle size of up to 20 $\mu$m and an average particle size within a range of from 1 to 2 $\mu$m, and it is possible to uniformly pulverize within a narrow range of particle size distribution into slurry, it is possible to determine the state of dissociation of aggregates and dispersion from changes in the particle size and conductivity during formation of slurry, and there is easily available a state of dispersion meeting the purpose such as conductivity, coloring, prevention of aging caused by heat or ultraviolet ray, or reinforcement.

As a result, wettability is remarkably improved, and uniform mixing with the resin matrix becomes easier by adjusting the particle size of slurry.

The above-mentioned functions and effects are achieved by producing slurry-form pulverized kneaded mixture through kneading of the carbonaceous conductive material and a solvent in a medium stirring mill as mentioned above. For the carbonaceous conductive material, there is no limitation imposed on the kind, whereas preferred materials include such known carbon blacks as Ketchen black, vulcan X72 and acetylene black which give a high conductivity with addition in a slight amount, and the carbon fibrils mentioned above having unique microstructure and properties.

From among several types and constructions of medium stirring mill, an annular continuous wet-type stirring mill using such pulverizing medium particles as zirconium and steel is a typical one applicable for the present invention. This mill is to pulverize a material by causing the material to be pulverized and a solvent to continuously flow, together with pulverizing medium, through the space between an inner cylinder and an outer cylinder of which the peripheral speed is controllable. The mill is capable of achieving even submicron pulverizing and has a feature of easy control of the particle size distribution. Various models, including known ones, of this type of stirring mill are now available.

A solvent is used during kneading and pulverizing in the medium stirring mill, and since the produced slurry-form kneaded mixture is mixed to the resin matrix, it is desirable to select a solvent by taking account of miscibility with the resin, properties such as separability from the resin, operability and safety.

Usually, any of various general-purpose solvents including such aromatic hydrocarbon solvents as toluene and xylene, organic solvents such as dioxane, THF and ether, aliphatic hydrocarbon solvents such as pentane and hexane, halogenized hydrocarbon solvents, and glycol-based solvents such as diethylene glycol may be appropriately employed.

Pulverizing may be conducted under conditions including a solid concentration of, for example, about 2 to 10%, an amount of treatment of 30 to 800 g/minute, and the room temperature. These figures are not of course limitative. It is needless to mention that selection must be made in response to the type and construction of the mill, the target particle size of pulverizing, the kind and size of the carbonaceous conductive material to be treated.

Mixing of the produced slurry into the resin matrix may be accomplished by master batch method or into a composition for product. There is no particular limitation as to the kind of resin.

Applicable thermo-plastic resins include, for example, acrylonitrile-butadiene-stylene resin (ABS resin), acrylonitrile-ethylene/propylene-stylene resin (AES resin), methyl methacrylate-butadiene-stylene resin (MBS resin), acrylonitrile-butadiene-methyl methacrylate-stylene resin (ABMS resin), acrylonitrile-n-butylacrylate-stylene resin (AAS resin), rubber modified polystylene (high-impact polystylene), polyethylene resin, poly-propylene resin, polystylene resin, polymethyl methacrylate resin, polyvinyl chloride resin, cellulose acetate resin, poly-amide resin, polyester resin, poly-acrylonitrile resin, poly-carbonate resin, poly-phenileneoxide resin, polyketone resin, polysulfon resin, polyphenylenesulfide resin, fluorine resin, silicon resin, polyimide resin, polybenzimidazole resin, and polyamide elastomer, and applicable thermo-setting resins include, for example, phenol resin, urea resin, melamine resin, xylene resin, diacyl phthalate resin, epoxy resin, aniline resin, furan resin, and polyurethane resin.

The carbonaceous conductive material in the slurry-form kneaded mass may be mixed in an appropriate ratio into the resin selected from those listed above. From the consideration of kneading efficiency, conductivity and dispersibility, it is desirable to blend the carbonaceous conductive material in an amount of 0.5 to 4 weight parts per 100 weight parts of the resin composition.

In addition to the carbonaceous conductive material of the present invention, a known additive such as a filler, a softener, a processing aid, a slip additive, an aging preventive agent, an ultraviolet absorber, or a foaming agent such as carbon fibril, carbon black, silica, diatomaceous earth, pulverized lime, talc, clay, mica, calcium silicate, magnesium silicate, glass powder, calcium carbonate, barium sulfate, zinc carbonate, titanium oxide, alumina, glass fibre, other carbon fibres, and organic fibres may be mixed as required into the resin composition.

The method of the present invention will no be described in detail by means of examples.

EXAMPLES

An annular continuous wet-type stirring mill (Kobol mill manufactured by Shinko-Bantech Co., Ltd.) was used as the medium stirring mill.

The construction and operating specifications for the mill were set as follows:
- o Medium (diameter): zirconium (0.5 to 1.5 mm dia.)
- o Pulverizing gap: 6.5 mm
- o Medium filling rate: 70%
- o Rotor peripheral speed: 13 m/second
- o Supply pressure: 0.2 to 0.5 kg/cm Under these conditions, an agglomeraation of micro-carbon fibrils having a diameter of 150 A and a length of 20 $\mu$m, which had previously been treated into fibrils having an average diameter of 65 $\mu$m and a maximum diameter of 100 $\mu$m in a colloid mill, was mixed with toluene so as to give a concentration of 4%, and stirred at a throughput of 500 g/minute. Three cycles of this operation were carried out.

A slurry-form kneaded mass containing pulverized carbonaceous conductive material having a maximum particle size of 3 $\mu$m and an average particle size of 1.6 $\mu$m was obtained.

This slurry-form kneaded mixture was mixed into an acrylic resin so as to achieve a content of carbonaceous conductive material of 3 wt. %.

This resulted in a satisfactory disperson of the conductive material, with a specific resistance of the resin of 1.2 k$\Omega$.cm and an excellent conductivity. In the application to a paint, almost no painting irregularities were observed.

With a concentration of 6%, pulverizing to a maximum particle size of 2 to 3 $\mu$m and to an average particle size of 1.4 $\mu$m was possible with two passes, and an excellent conductivity as above was obtained.

In all cases, uniform dispersion of spherical particles was confirmed through observation by means of an optical microscope (200 magnifications).

Ketchen black having an average particle size of 120 $\mu$m was treated in the same manner as in the case described above. Blending of 3 wt. % (maximum particle size: 8 $\mu$m/average particle size: 5 $\mu$m) into a resin gave an excellent conductivity as represented by a specific resistance of 3 k$\Omega$.cm.

According to the present invention, as described above in detail, it is possible to cause highly uniform dispersion of a carbonaceous conductive material into a resin, with easy uniform mixing into a resin matrix, and achieve an excellent contuctivity.

What is claimed is:

1. A method of manufacturing a conductive resin composition, which consists essentially of the steps of kneading a conductive component consisting of carbon black particles with an organic solvent in a medium stirring mill in which the carbon black particles are present in a concentration of 2 to 10% and mixing the resultant slurry kneaded mixture into a resin matrix, said carbon black particles being pulverized to an average particle size of 1 to 2 $\mu$m during kneading, said carbon black particles being mixed with the resin matrix in an amount of 0.5 to 4 weight parts per 100 parts of the resin, and wherein said organic solvent is miscible with the resin matrix.

2. A method according to claim 1, wherein pulverizing medium particles are employed in the medium stirring mill.

* * * * *